United States Patent

[11] 3,590,755

[72] Inventor Michael H. Niemann
 920 Chestnut St., Wisconsin Rapids, Wis. 54494
[21] Appl. No. 852,311
[22] Filed Aug. 22, 1969
[45] Patented July 6, 1971

[54] CHARCOAL BRIQUETTE IGNITER
 8 Claims, 3 Drawing Figs.
[52] U.S. Cl. ................................................. 110/1 F, 126/25 B, 219/161
[51] Int. Cl. ................................................. F23b 3/00
[50] Field of Search ................................................. 431/262; 110/1; 126/25; 219/160, 161

[56] References Cited
UNITED STATES PATENTS
| 1,627,735 | 5/1927 | Hadaway | |
| 2,996,597 | 8/1961 | Persinger et al. | 126/25 |
| 3,334,214 | 8/1967 | Davidson | 126/25 |
| 3,339,505 | 9/1967 | Bean | 110/1 X |
| | | | 110/1 |

Primary Examiner—Edward G. Favors
Attorney—Hofgren, Wegner, Allen, Stellman & McCord ABSTRACT: A containerized charcoal briquette igniter including a cylindrical housing for receiving charcoal having an inner bottom, a main bottom, handle and a vertically projecting, electric heating element clamped to the inner bottom and extending along the cylindrical axis of the housing.

PATENTED JUL 6 1971 3,590,755
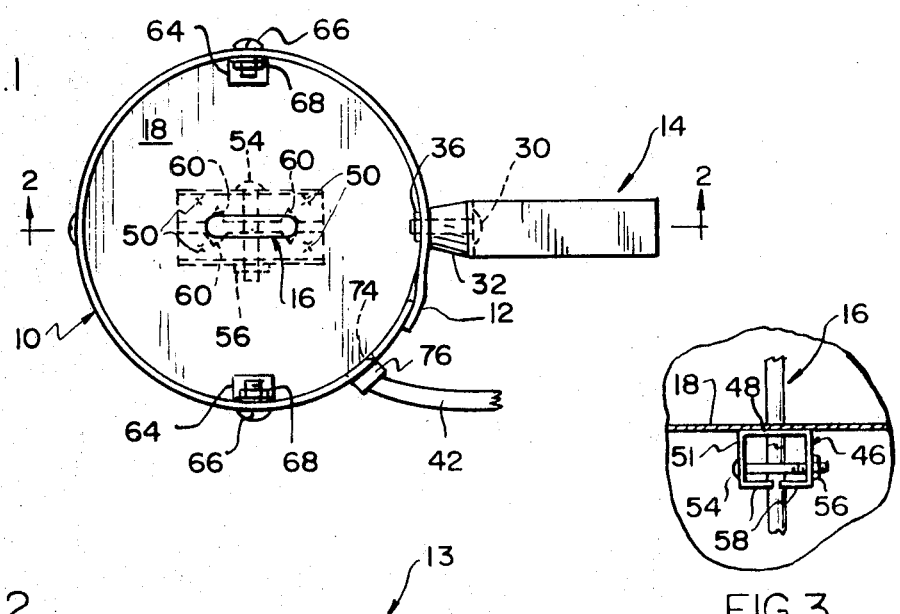
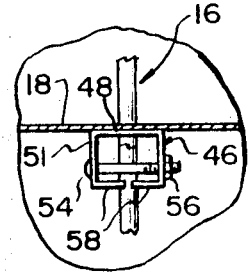
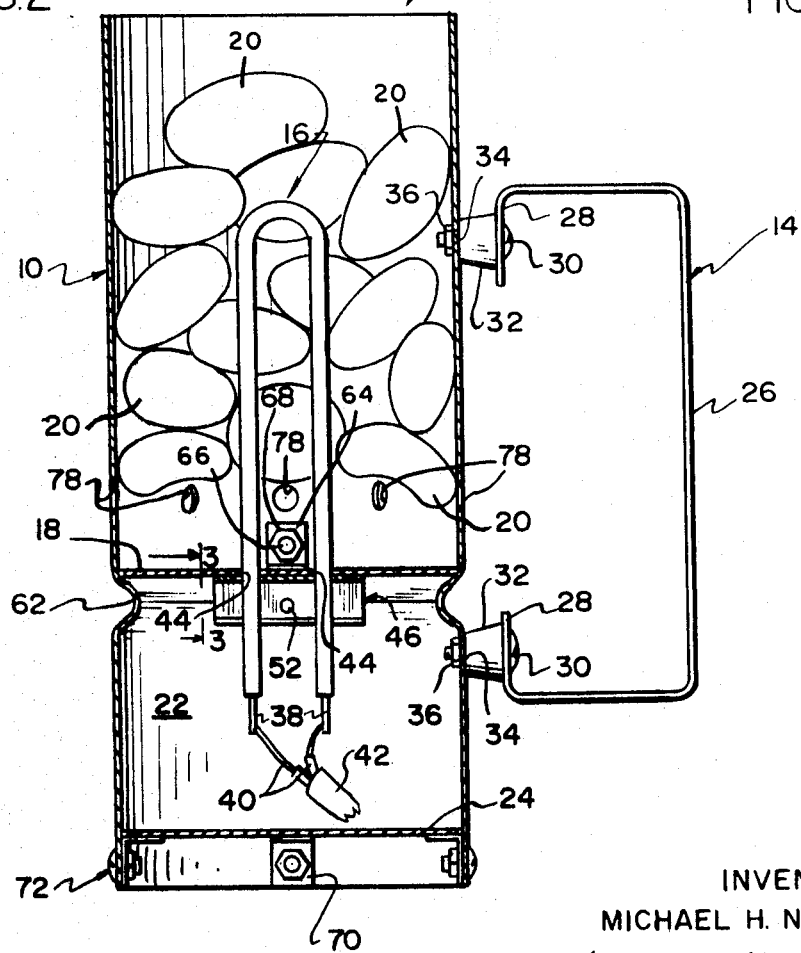
INVENTOR.
MICHAEL H. NIEMANN
BY Hofgren, Wegner, Allen,
Stellman & McCord.
ATTORNEYS.

3,590,755

CHARCOAL BRIQUETTE IGNITER

BACKGROUND OF THE INVENTION

Charcoal cooking has become increasingly popular despite the obvious difficulties encountered in starting briquette fires due to the slowness of starting such fires as well as the rather dirty and dusty character of the charcoal which must be handled preparatory to starting the fire.

Several products have been placed on the market to aid starting a briquette fire. One popular method in starting charcoal is to saturate the charcoal briquettes with a highly flammable liquid product and, then, to ignite the charcoal. After about a half an hour, a fire suitable for grilling will result. The use of such flammable liquids provides obvious danger and precautions must be taken both during usage and for storage.

More recently, electrical elements or rods temporarily or permanently placed in charcoal grills have been added to the list of various starting aids. And while electrical starters are a significant improvement over flammable liquids, there remains the undesirable problem of handling the briquettes preparatory to starting the fire.

SUMMARY OF THE INVENTION

The principal object of the invention is to provide a new and improved electrical charcoal briquette fire starter. According to the invention, there is provided a generally vertically arranged housing having a bottom from which there projects upwardly, an electrical heating element of the type which will heat to red heat when energized. According to one embodiment of the invention, the housing is cylindrical in shape and the heating element is located along the cylindrical axis.

As a result of the foregoing construction, all of the advantages of electrical charcoal briquette igniters are present and further, the briquettes may be easily arranged in proximity to the igniting element simply by pouring the same from a bag or other container in which they are purchased into the housing.

Other features of the invention include the unique means by which the electrical heating element is secured to the bottom of the briquette-receiving housing together with the provision of a false bottom for housing certain of the electrical components. Also, the arrangement by which the handle for the housing is formed and connected thereto provide for economy of manufacture.

Other objects and advantages will become apparent from the following specification taken in conjunction with the accompanying drawings.

DESCRIPTION OF THE DRAWINGS

FIG. 1 is a plan view of a charcoal briquette igniter made according to the invention;

FIG. 2 is a vertical section of the briquette igniter taken approximately along the line 2-2 of FIG. 1; and FIG. 3 is a fragmentary vertical section of a securing means used in the invention and is taken approximately along the line 3-3 of FIG. 2.

DESCRIPTION OF THE PREFERRED EMBODIMENT

An exemplary embodiment of a charcoal briquette starter made according to the invention is illustrated in FIGS. 1 and 2 and seen to comprise a housing, generally designated 10, in the form of a vertically arranged cylinder. The housing 10 is formed by rolling a sheet of steel which will result in the presence of a seam 12 which may be secured by spot welding or the like and an open top 13.

Secured to the exterior of the housing, is a generally vertically arranged handle, generally designated 14, which may be used for manipulating the same while interiorly of the housing and near the upper portion thereof there is located an electrical, charcoal ignition element, generally designated 16. The element 16 is secured along the cylindrical axis of the housing 10 by mounting means including an inner bottom element 18. As a result, the space between the housing 10, the inner bottom 18, and the charcoal ignition element 16 defines a charcoal-briquette-receiving space for receiving charcoal briquettes 20.

Below the inner bottom 18 there is located a chamber 22 which houses electrical connecting means for the element 16. The chamber 22 is further defined by a bottom element 24.

Turning now to the handle 14, it will be seen that the same is comprised of a generally U-shaped member 26 having inturned ends 28 at the extremity of its legs. Bores (not shown) in the inturned ends 28 receive bolts 30 which in turn pass through insulating elements 32 to be received in aligned bores 34 in the housing 10. Nuts 36 hold the screws, and thus the handle 14, in place.

The electrical ignition element 16 is in the form of a sheathed electrical heating element capable of being heated to red heat when energized. As illustrated, the same is U-shaped and connecting elements 38 at the lower ends of the element 16 within the chamber 22 are electrically connected to leads 40 received within a cord 42 which may be provided with a plug (not shown) for reception in an electrical receptacle.

The legs of the element 16 pass through apertures 44 in the bottom plate 18 and are maintained in the position illustrated in FIG. 2 by means of a clamping element, generally designated 46. As best seen in FIG. 3, the clamping element 46 is a generally channel-shaped member having an apertured base 48 which is spot welded as at 50 to the underside of the plate 18. The sides 50 of the clamping element 46 include lined apertures 52 (FIG. 2, only one of which is shown) which may receive a bolt 54 and nut 56 for the purpose of drawing the two sides 50 together to provide clamping action as will be seen.

The lowermost ends of the clamp 46 comprise a pair of inturned edges 58 which, as best seen in FIG. 1, include complementary half diamond cutout portions 60 aligned with the legs of the element 16. The arrangement is such that the legs of the element 16 pass through the apertures 44 in the bottom plate 18 and apertures (not shown) in the base and through the diagonal cutout portions 60. When the nut 56 is tightened on the bolt 54, the cutout portions 60 will tightly engage the sides of the element 60 to hold the same in the position illustrated.

The bottom plate 18 is mounted in the position illustrated by means of a bead 62 which is rolled in the exterior surface of the housing 10 and serves as the lowermost support for the bottom plate 18. (Additionally, a pair of angle brackets 64 secured to the housing 10 by means of bolts 66 and nuts 68 passing through apertures (not shown) in the side of the housing 10, with the arrangement being such that the lower arm of the angle bracket 64 is located above the bottom plate 18 and holds the same tightly against the upper side of the bead 62. If desired, the horizontal arms of the brackets 64 may be spot welded to the bottom 18.)

The bottom element 24 is similarly held in the location shown by means of similar angle brackets 70 and securing means, generally designated 72. Again the horizontal arms of the angle brackets 70 may be spot welded or the like to the bottom 24.

The housing 10, at a point beneath the bottom member 18 and above the bottom member 24, is provided with a bore 74 receiving a conventional plastic protecting member 76 through which the cord 42 may pass.

Additionally, that portion of the housing 10 above the bottom 18 is provided with a plurality of bores 78 to provide for the admission of air during the briquette ignition process. Preferably, the bores 78 are located just above the bottom plate 18.

According to one embodiment of the invention, the housing 10 is formed with a 5-inch diameter and the sides of the same extend above the bottom 18 a vertical dimension of approximately 7½ inches. In order to insure adequate admission of combustion air, it is desirable that the diameter of the ventilation apertures 78 be on the order of three-eighths inches. Also, in order to insure that even after extended use during which the device may be subjected to extreme corrosion, that the bottom plate 18 will not fall downwardly into the chamber 22, it is desirable that the bead 62 extend approximately one-fourth of an inch into the cylinder defined by the housing 10.

The above-mentioned parameters are merely exemplary of a specific set of dimensions that may be used in fabricating a charcoal briquette igniter according to the teachings of the invention. In general, it has been found that the height of the charcoal briquette receiving area may be increased fifty percent to increase the capacity if desired. Depending upon the degree of extension, a commensurate extension of the element 16 within charcoal-receiving space may or may not be necessary. It is also desirable that the diameter of the housing be made on the order of 5 inches as mentioned previously when briquettes of a conventional size are used inasmuch as such a relationship will insure that almost all briquettes are in extremely close proximity to the element 16 to insure rapid ignition.

In use, the charcoal-briquette-receiving space may be filled with briquettes directly from a bag or other container in which they are purchased and without being touched by hand. Thereafter, the element 16 may be energized for a period normally on the order of about 10 minutes which will result in ignition of the lower briquettes. The naturally rising heat will cause the briquettes above the lowermost briquettes to burn and convection currents of combustion air through the apertures 78 will expedite burning and the oxidation rate to thereby add to the heat generated by the heating element. Finally, when all the briquettes are ignited, it is merely necessary to grasp the igniter by the handle 14 and empty the same in the grill.

Having described a specific embodiment of the invention for exemplification purposes, I do not wish to be limited to the details set forth, but rather, to have my invention construed in accordance with the following claims.

I claim:

1. A charcoal briquette igniter comprising: a vertically arranged housing having a closed, charcoal briquette supporting bottom and an open top; an elongated, generally vertically arranged electrical electrical ignition means centered within said housing and extending upwardly from said bottom, the space between said ignition means and said housing defining a charcoal briquette receiving area; said housing and said ignition means being configured with respect to each other to define said briquette receiving area to insure that almost all briquettes received therein are in extremely close proximity to the ignition means to insure rapid ignition; a plurality of combustion air admission apertures in said housing just above said bottom; and handle means secured to said housing.

2. The invention of claim 1 wherein said ignition means projects upwardly of said bottom and further including clamping means welded to the underside of said bottom and securing said ignition means to said bottom.

3. The invention of claim 2 wherein said clamping means comprises an inverted channel element having inturned edges adapted to frictionally engage the ignition means and further including tightening means for moving said inturned edges toward each other.

4. The invention of claim 1 wherein said handle means comprises a generally U-shaped member, means securing said U-shaped member to said housing, and insulator means interposed between said housing and said U-shaped member.

5. The invention of claim 1 wherein said housing is generally cylindrical and has a diameter of approximately 5 inches; said electrical ignition means being generally vertically arranged along the cylindrical axis of said housing so that charcoal briquettes received within said housing will be in close proximity to said electrical ignition means to facilitate rapid ignition thereof.

6. A charcoal briquette igniter according to claim 5 wherein said air admission apertures have cross-sectional dimensions on the order of three-eighths inches.

7. A containerized charcoal briquette igniter comprising: a housing having a generally cylindrical sidewall, an inner bottom with apertures therein defining a charcoal briquette receiving area, and a vertically spaced main bottom; an inwardly directed bead extending about the periphery of said sidewall just below said inner bottom to support the same; means holding said inner bottom against said bead; means securing said main bottom to said sidewall whereby said main bottom and said inner bottom define a chamber; an inverted, vertically oriented, U-shaped electrical igniting means projecting upwardly through said apertures in said inner bottom into said charcoal briquette receiving area, said inner bottom into said charcoal briquette receiving area, said ignition means including terminals within said chamber; clamp means mounted within said chamber for supporting said electrical ignition means; said chamber further including an outlet; an electrical cord extending through said outlet and connected to said terminals; handle means; and means securing said handle to said housing in insulated relationship with respect thereto; said housing and said electrical ignition means being constructed so that charcoal briquettes received within said briquette receiving area will be located in close proximity to said electrical ignition means to insure rapid ignition thereof.

8. A containerized charcoal briquette igniter according to claim 7 wherein said clamp means comprises an inverted channel member having inturned ends secured to the underside of said inner bottom and having apertures aligned with the apertures in said inner bottom; and tightening means for moving said inturned ends towards each other, said electrical ignition means passing through the apertures in said channel and between said inturned ends whereby the same may be securely clamped in place by operation of said tightening means.